US011922444B1

(12) United States Patent
Zha et al.

(10) Patent No.: US 11,922,444 B1
(45) Date of Patent: Mar. 5, 2024

(54) SYSTEMS, METHODS, AND MEDIA FOR CLASSIFYING ELECTRONIC VOICE OF THE CUSTOMER DATA USING EMOTION PROFILES GENERATED FOR A PLURALITY OF CLUSTERS

(71) Applicant: FMR LLC, Boston, MA (US)

(72) Inventors: Sihan Zha, Jersey City, NJ (US); Chaitra Vishwanatha Hegde, Mountain View, CA (US); Preethi Raghavan, Belmont, MA (US); Zhengzheng Pan, Fishers, IN (US); Nathaniel Young, Ann Arbor, MI (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/103,775

(22) Filed: Jan. 31, 2023

(51) Int. Cl.
*G06Q 30/0204* (2023.01)
*G06F 16/65* (2019.01)

(52) U.S. Cl.
CPC ......... *G06Q 30/0204* (2013.01); *G06F 16/65* (2019.01)

(58) Field of Classification Search
CPC ............................ G06Q 30/0204; G06F 16/65
See application file for complete search history.

(56) References Cited

U.S. PATENT DOCUMENTS

| | | | | |
|---|---|---|---|---|
| 7,940,186 | B2 * | 5/2011 | Aaron | G06Q 30/02 340/522 |
| 9,842,146 | B2 * | 12/2017 | Chen | G06F 16/24578 |
| 2004/0249650 | A1 * | 12/2004 | Freedman | G06Q 30/0201 705/7.29 |
| 2014/0220526 | A1 * | 8/2014 | Sylves | G06Q 10/06395 434/238 |

* cited by examiner

*Primary Examiner* — Nadja N Chong Cruz
(74) *Attorney, Agent, or Firm* — Cesari and McKenna, LLP

(57) ABSTRACT

VoC data, e.g., plurality of VoC communications, for a plurality of customers can be collected. A clustering algorithm may be utilized to generate a plurality of cluster each of which is assigned a group of customers that share similar metadata. An emotion profile may be generated for each cluster based on segment detected emotions for the VoC data corresponding to the customers that are assigned to the cluster. The emotion profile for a cluster may represent the normal or expected emotions experienced during VoC communications by customers assigned to the cluster. New VoC data corresponding to a new customer may be received. A cluster may be identified based on the metadata of the new customer, and the emotion attributes of the new VoC data may be compared to the emotion profile of the identified cluster. Based on the comparison, one or more deviation can be identified to trigger an action.

20 Claims, 9 Drawing Sheets

300

| Interaction ID (310) | Segments (315) | Emotion Label (325) | Detected Emotion (320) |
|---|---|---|---|
| 305A 277895747 | [5.37] | [0] | [neutral] |
| 300B 277903737 | [5.01, 6.74] | [2, 2] | [concerned, concerned] |
| 300C 277903978 | [3.52, 5.88, 10.56, 9.05, 3.48, 5.34, 6.08] | [0, 2, 0, 0, 0, 0 0] | [neutral, concerned, neutral, [neutral, neutral, neutral, neutral] |
| 300D 277908180 | [10.95, 11.07, 8.73, 13.87, 13.87, 11.92, 10.22, 9.33, 10.21] | [0, 2, 3, 3, 0, 1, 0, 1, 1] | [neutral, concerned, angry, angry, [neutral, happy, neutral, happy, happy] |
| 300E 277908206 | [5.61, 14.5] | [0, 0] | [neutral, neutral] |

| | Interaction ID (410) | Emotion Ratio Value (415) | Normalized Length Value (420) | Normalized Volatility Value (425) | End Score Value (430) |
|---|---|---|---|---|---|
| 405A | 277895747 | 0.0000 | 5.37 | 0.0000 | 0.5000 |
| 400B | 277903737 | 1.0000 | 11.75 | 0.0000 | 0.8000 |
| 400C | 277903978 | 0.1429 | 43.91 | 0.3849 | 0.5000 |
| 400D | 277908180 | 0.1250 | 100.17 | 0.4841 | 0.1667 |
| 400E | 277908206 | 0.0000 | 20.11 | 0.0000 | 0.5000 |

| | Cluster ID (510) | Normalized Age (515) | Gender (525) | Normalized Income (520) |
|---|---|---|---|---|
| 505A | 0 | 0.4222 | 0.0 | 0.5224 |
| 500B | 1 | 0.6535 | 0.0 | 0.2301 |
| 500C | 2 | 0.2011 | 1.0 | 0.1109 |
| 500D | 3 | 0.2245 | 0.0 | 0.7416 |
| 500E | 4 | 0.5972 | 1.0 | 0.2233 |
| 500F | 5 | 0.2487 | 0.0 | 0.1112 |
| 500G | 6 | 0.2136 | 1.0 | 0.3941 |
| 500H | 7 | 0.3694 | 1.0 | 0.7113 |

| | Cluster ID (610) | Mean Emotion Ratio Value (615) | Mean Length Value (620) | Mean Volatility Value (625) | Mean End Score Value (630) | |
|---|---|---|---|---|---|---|
| 605A | 0 | 0.1005 | 102.2612 | 0.2698 | 0.4078 | |
| 600B | 1 | 0.0559 | 103.9767 | 0.1871 | 0.3929 | |
| 600C | 2 | 0.2004 | 197.6125 | 0.3981 | 0.4229 | |
| 600D | 3 | 0.1188 | 103.2635 | 0.3354 | 0.3436 | |
| 600E | 4 | 0.1482 | 193.4598 | 0.3090 | 0.4552 | |
| 600F | 5 | 0.1271 | 153.0084 | 0.3264 | 0.9365 | |
| 600G | 6 | 0.2266 | 167.2955 | 0.4151 | 0.5409 | |
| 600H | 7 | 0.1993 | 143.6314 | 0.3714 | 0.4373 | |

| SD Emotion Ratio Value | SD Length Value | SD Volatility Value | SD End Value |
|---|---|---|---|
| 0.1509 | 214.2792 | 0.2169 | 0.2479 |
| 0.1147 | 159.0951 | 0.1903 | 0.2092 |
| 0.1370 | 241.0618 | 0.1405 | 0.1987 |
| 0.1512 | 182.1662 | 0.1989 | 0.2969 |
| 0.1432 | 306.5705 | 0.1856 | 0.1880 |
| 0.1444 | 221.1443 | 0.2009 | 0.2138 |
| 0.1518 | 250.2089 | 0.1624 | 0.2074 |
| 0.1615 | 250.2129 | 0.1748 | 0.2610 |

| Interaction ID (810) | Emotion Ratio Value (815) | Normalized Length Value (820) | Normalized Volatility Value (825) | End Score Value (830) |
|---|---|---|---|---|
| 27998745 | 0.0714 | 279.8000 | 0.4057 | 0.4769 |

FIG. 8

SYSTEMS, METHODS, AND MEDIA FOR CLASSIFYING ELECTRONIC VOICE OF THE CUSTOMER DATA USING EMOTION PROFILES GENERATED FOR A PLURALITY OF CLUSTERS

BACKGROUND

Technical Field

The present disclosure relates generally to the analysis of electronic voice of the customer data, and more specifically to techniques for classifying electronic voice of the customer data using emotion profiles generated for a plurality of clusters.

Background Information

Voice of the customer (VoC) data is information that indicates how customers think and feel about an enterprise, i.e., business, and the products/services offered by the enterprise. Additionally, VoC data is information that contains customer questions and/or requests for information. VoC data can be collected through, for example, surveys, chat sessions, audio calls, social listening, etc. VoC data collection can be an effective tool that helps enterprises monitor and understand its customers' experiences.

If analyzed correctly, VoC data can help identify areas where an enterprise fails to deliver on customers' expectations. This in turn can allow an enterprise to make their products/services better and/or improve the overall experience for both current and future customers—making it easier to increase retention rates and revenue.

However, analysis of the VoC data can be difficult. For example, VoC data may include unstructured data (e.g., email, chats session, social media post) that is rich with customer verbatims that are indicative of a customer's sentiments. Analyzing the customer's sentiments in a meaningful way to determine when a customer's expectations have not been met remains a challenge in the industry.

SUMMARY

Techniques are provided for classifying voice of the customer (VoC) data utilizing emotion profiles generated for a plurality of clusters. Specifically, and as will be described in further detail below, an emotion profile may be generated for each of a plurality of clusters that is assigned a group of customers that share customer metadata. New VoC data for a customer may be collected, and one or more selected clusters may be identified to determine if emotion attributes of the new VoC data deviate from the emotion profiles of the one or more selected clusters. Based on the determined deviations, one or more actions may be triggered.

In an embodiment, a processor, e.g., a VoC module executed by the processor, may collect VoC data that includes a plurality of VoC communications corresponding to a plurality of customers, i.e., users, of an enterprise. The processor may segment each VoC communication into segments and obtain interaction metadata corresponding to each VoC communication. Each segmented VoC communication and corresponding interaction metadata may be provided as input to an emotion detection model, i.e., pre-trained model. The emotion detection model may output a detected emotion for each segment of each VoC communication.

The processor may generate emotion attributes for each VoC communication utilizing the segment detected emotions. Specifically, the processor may analyze the segment detected emotions to determine corresponding emotion attributes for each VoC communication. For example, the emotion attributes may indicate (1) a level or amount of concern a customer expressed during a VoC communication, (2) an overall length in seconds of the VoC communication, (3) an amount of volatility in the customer's emotions during the VoC communication, and (4) the emotions expressed by the customer during a portion of the VoC communication that is defined as an end phase.

The processor may train a device, e.g., clustering model, by generating/forming a plurality of clusters and generating an emotion profile for each cluster. Specifically, the processor may generate/form a plurality of clusters utilizing customer metadata, where each cluster is assigned a group of customers that have similar characteristics or attributes. The processor may generate an emotion profile for each cluster utilizing the emotion attributes determined for the VoC communications of the customers assigned to each cluster.

In an embodiment, new VoC data may be collected for a customer. New VoC data may be VoC communications that have not yet been utilized to generate an emotion profile of a cluster. The processor may utilize customer metadata of the customer to identify one or more clusters of the plurality of clusters. The processor may compare the emotion attributes of the new VoC data with the emotion profiles of the one or more identified clusters. Based on the comparison, the processor may determine if one or more deviations exist between the emotion attributes of the new VoC data and the emotion profiles of the one or more identified clusters. If one or more deviations are identified, the processor may trigger an action that is to be performed. In an embodiment, the action may be intended to cause a change in customer's experience such that the customer's emotion attributes are consistent with the emotion profile of the identified clusters. For example, the triggered action may be a notification to an employee of the enterprise indicating that the employee should contact the customer.

Accordingly, an enterprise can make their products/services better and improve the overall experience for both current and future customers—resulting in increased retention rates and revenue. As such, the one or more embodiments as described herein provide in an improvement in the existing technological field of electronic VoC analysis and processing.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which:

FIG. 3 is an illustration of an example table that includes five VoC communications, corresponding interaction metadata, and detected emotions for each VoC segment according to the one or more embodiments as described herein;

FIG. 4 is an illustration of an example table that includes emotion attributes determined for the five VoC communications of FIG. 3 according to the one or more embodiments as described herein;

FIG. 5 is an illustration of an example table defining a plurality of clusters generated utilizing customer metadata according to the one or more embodiments as described herein;

FIGS. 6A and 6B are an illustration of an example table that includes an emotion profile that may be generated for each of the eight clusters of FIG. 5 according to the one or more embodiments as described herein;

FIG. 8 is an illustration of an example table entry that includes the emotion attributes generated for the new VoC communication of FIG. 7 according to the one or more embodiments as described herein.

DETAILED DESCRIPTION OF AN ILLUSTRATIVE EMBODIMENT

Figure 1:
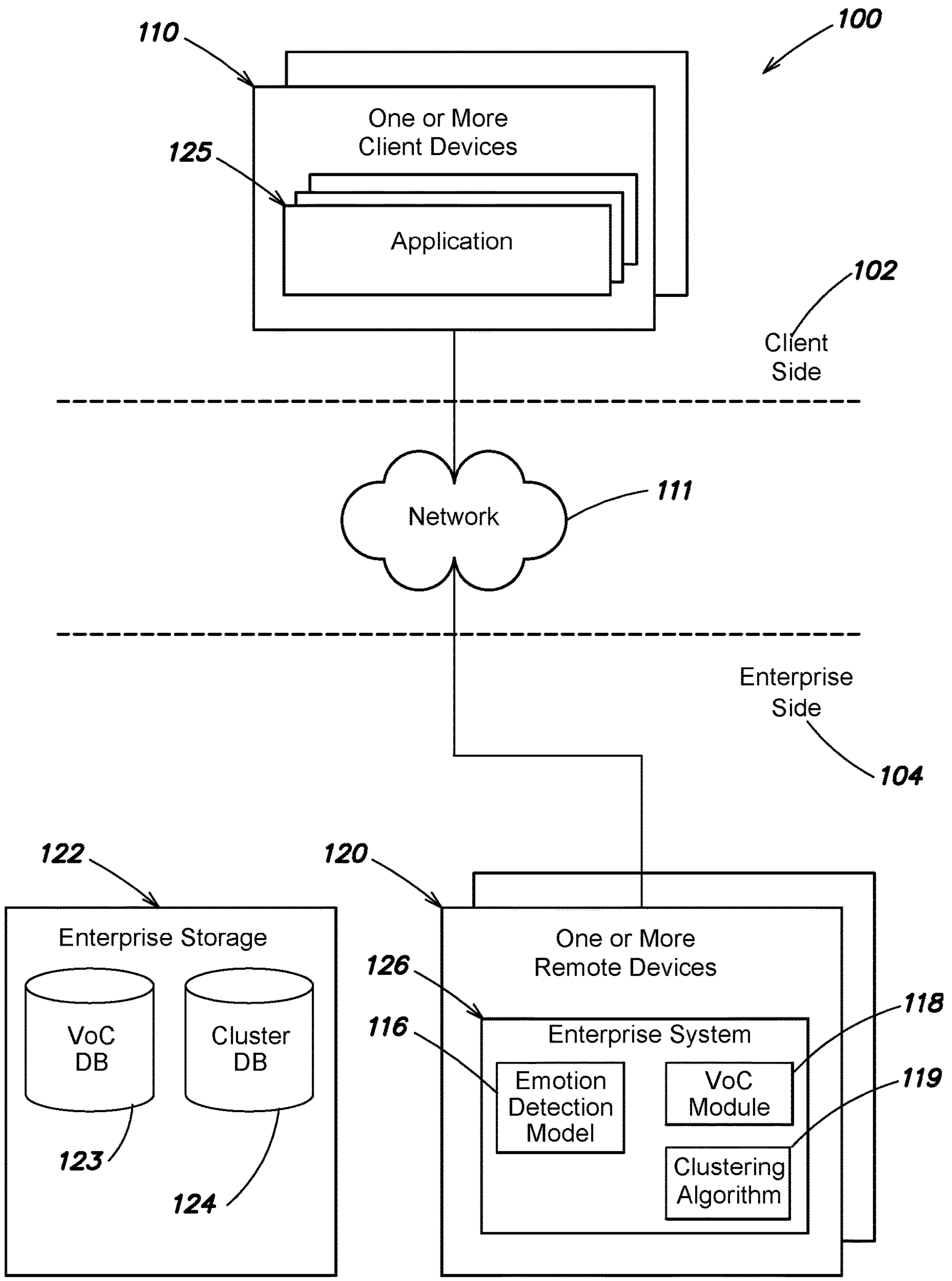
FIG. 1 is a high-level block diagram of an example architecture for classifying electronic voice of the customer (VoC) data using emotion profiles generated for a plurality of clusters according to one or more embodiments as described herein.

FIG. 1 is a high-level block diagram of an example architecture 100 for classifying electronic voice of the customer (VoC) data using emotion profiles generated for a plurality of clusters according to one or more embodiments as described herein. The architecture 100 may be divided into a client side 102 that includes one or more local client devices 110 that are local to end users, and an enterprise side 104 that includes one or more remote devices 120 and enterprise storage 122 that are remote from end users.

In an embodiment, the one or more remote devices 120, of the enterprise side 104, may be one or more cloud-based devices and/or one or more server devices. The one or more remote devices 120 may store and execute enterprise system 126 that may implement the one or more embodiments as described herein. In an embodiment, the enterprise system 126 may be managed, operated, and maintained by an enterprise. In an embodiment, the enterprise may be a financial services institution. In an implementation, the enterprise system 126 is an application, i.e., software. The enterprise system 126 may be accessible to its customers and/or authorized personnel, e.g., employees, of the enterprise. The enterprise system 126 includes emotion detection model 116, VoC module 118, and clustering algorithm 119. The VoC module 118 may utilize the emotion detection model 116 and clustering algorithm 119 as described in further detail below. In an embodiment, only authorized personnel of the enterprise can execute the VoC module 118 to implement the one or more embodiments as described herein.

The enterprise storage 122 includes VoC database 123 and cluster database 124. VoC database 123 may store VoC data and corresponding information, e.g., segment detected emotions and interaction metadata, according to the one or more embodiments as described herein. Cluster database 124 may store generated clusters and corresponding generated emotion profiles according to the one or more embodiments as described herein. In an embodiment, each of VoC database 123 and cluster database 124 may be a relational database. Enterprise storage 122 may also include other storage that may store any other data that is generated and/or obtained according to the one or more embodiments as described herein. In an implementation, the other storage of enterprise storage 122 may be a database (e.g., relational database), persistent storage, etc.

The client side 102 may include one or more local client devices 110 that provide a variety of user interfaces and non-processing intensive functions. For example, a local client device 110 may provide a user interface, e.g., a graphical user interface and/or a command line interface, for receiving user input and displaying output according to the one or more embodiments as described herein. In an embodiment, the client device 110 may be a server, a workstation, a platform, a mobile device, a network host, or any other type of computing device. The client device 110 may be operated by, for example, customers of the enterprise. For example, the client device 110 may download and execute application 125 that is provided by the enterprise. The execution of application 125 may allow customers of the enterprise to implement one or more financial services functions. In an embodiment, VoC data may be generated based on a customer's operation of client device 110. For example, a customer may operate application 125 executing on client device 110, and VoC data may be generated based on the execution of application 125.

Client device 110 may also be operated by authorized personnel, e.g., employees, of the enterprise. For example, and as will be described in further detail below, authorized personnel may utilize client device 110 to execute VoC module 118 to initiate the implementation of the one or more embodiments as described herein. Specifically, authorized personnel may utilize client device 110 to initiate the generation of a plurality of clusters and/or classification of new VoC data as will be described in further detail below.

Each computing device, e.g., one or more local client devices 110, one or more remote devices 120, and enterprise storage 122, may include processors, memory/storage, a display screen, and/or other hardware (not shown) for executing software, storing data, and/or displaying information.

As will be described in further detail below with reference to FIGS. 2-6, VoC data from a plurality of customers may be processed and utilized to generate a plurality of clusters and generate an emotion profile for each of the plurality of clusters. As will be described in further detail below with reference to FIGS. 7 and 8, new VoC data (e.g., VoC data not yet utilized in the generation of an emotion profile) may be classified utilizing the emotion profiles corresponding to one or more identified clusters. Based on the classification, one or more actions can be identified and implemented to improve customer or future-customer experience and/or satisfaction with the enterprise.

Figure 2:
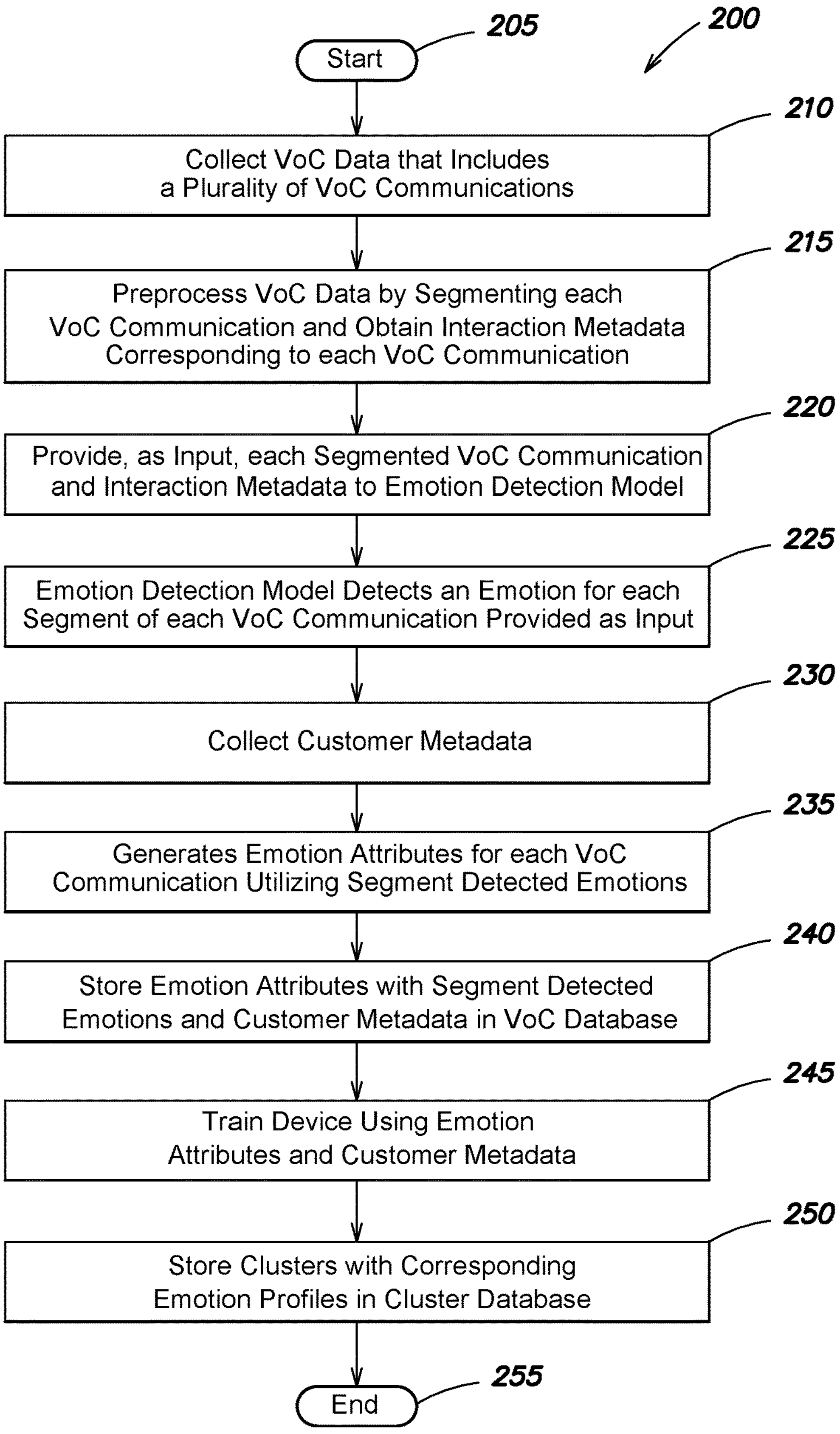
FIG. 2 is a flow diagram of a sequence of steps for generating a plurality of clusters and generating an emotion profile for each cluster according to the one or more embodiments as described herein.

FIG. 2 is a flow diagram of a sequence of steps for generating a plurality of clusters and generating an emotion profile for each cluster according to the one or more embodiments as described herein. In an embodiment, procedure 200 of FIG. 2 may be performed on-demand. For example, authorized personnel of the enterprise may utilize client device 110 to provide an input command such that the procedure 200 of FIG. 2 may be initiated and performed. Alternatively, procedure 200 of FIG. 2 may be performed at one or more predetermined times or on a predetermined schedule. For example, procedure 200 may be performed daily.

The procedure 200 begins at step 205 and continues to step 210 where the VoC module 118 collects customer VoC data. Although the description at times may refer to VoC data instead of electronic VoC data, it is expressly contemplated that VoC data as referred herein is electronic VoC data. As such, the reference to VoC data is for simplicity and ease of understanding.

In an embodiment, the VoC data includes a plurality of VoC communications. Each VoC communication may provide (1) information regarding a customer's satisfaction/dissatisfaction with an enterprise and/or its products/services, (2) information regarding a customer's expectations with respect to the enterprise and/or its products/services, and/or (3) information describing a customer's interaction with the enterprise and/or its product services. VoC communications may include, but are not limited to, customer surveys, transcripts, live chat sessions, social media postings, recorded call data, online customer reviews, email communications, feedback forms, etc. For example, a customer may execute application 125 on client device 110 and participate in a chat session with a chat agent employed by the enterprise. During the chat session, the customer may discuss with the chat agent questions, issues, etc. that the customer is having in relation to the enterprise and/or goods/services offered by the enterprise. The VoC communication, e.g., chat data, generated during the chat session may be stored in enterprise storage 122, e.g., VoC database 123, with a unique identifier of the customer and/or a unique identifier assigned to the VoC communication.

In an embodiment, the VoC module 118 may collect the VoC data stored on VoC database 123. Alternatively, the VoC module 118 may collect the VoC data directly from the client devices 110 operated by customers of the enterprise. It is expressly contemplated that the VoC module 118 may collect the VoC data in any of a variety of different ways and as known by those skilled in the art. In an embodiment, the VoC module 118 may collect the VoC data, for a plurality of customers, within a predefined time range. In an implementation, the predetermined time range is 10 years.

The procedure continues to step 215 and the VoC module 118 preprocesses the VoC data by segmenting each VoC communication and the VoC module 118 also obtains interaction metadata corresponding to each VoC communication. Specifically, the VoC module 118 may segment a VoC communication into one or more segments utilizing any of a variety of different techniques as known by those skilled in the art. In an embodiment, a segment of a VoC communication may be a timespan, e.g., length in seconds, within the VoC communication that is defined by a start time and an end time within the VoC communication.

In an embodiment, the VoC module 118 may identify the start time and the end time for a segment based on (1) one or more predefined characters/values included in the VoC communication, (2) a predefined condition that occurs during the VoC communication, or (3) based on any other characteristics associated with the VoC communication. For example, a start time of a first segment of a chat session may be the start of the chat session, e.g., predetermined condition, while the end time of the first segment may be a first point in time during the chat session where there is no communication between the customer and chat agent for more than 5 seconds, e.g., a predefined condition.

The start time of the second segment may be the end time of the first segment, e.g., predefined condition, and the end time of the second segment may be a next point in time during the chat session where there is no communication between the customer and chat agent for more than 5 seconds. Although the example as described herein uses a pause in communication to define the lengths of chat segments, it is expressly contemplated that any of a variety of different factors, characteristics, and/or techniques may be utilized to segment a VoC communication into one or more segments. For example, the chat session may be divided into a number of similarly sized segments. As such, the example as described herein is for illustrative purposes only. In an embodiment, each segment of the VoC data only includes the communication from the customer and the communication from the chat agent may be removed from each segment.

The VOC module 118 may also obtain interaction metadata corresponding to each of the VoC communications. The interaction metadata may include, but is not limited to, one or more of—an interaction identifier, a date, a topic. The interaction identifier may be an alphanumeric value that uniquely identifies a collected VoC communication to differentiates the collected VoC communication from all other collected VoC communications. The date may be a time stamp that identifies the date and time on which the VoC communication took place. The topic may be one or more keywords that identify the topic of the VoC communication.

The procedure continues to step 220, and the VoC module 118 provides, as input, each segmented VoC communication and the interaction metadata to emotion detection model 116. In an embodiment, the emotion detection model 116 is a machine learning (ML) model that can receive text, audio, images, and/or video as input, and provide as output emotions detected for the received input. Such emotion outputs may include, but are not limited to, happy, concerned, neutral, angry, etc. According to the one or more embodiments as described herein, emotion detection model 116 may be any type of model that is configured to detect human emotion from a textual, audible, or visual input source.

The procedure continues to step 225 and the emotion detection model 116 detects an emotion for each segment of each VoC communication that is provided as input. FIG. 3 is an illustration of an example table 300 that includes five VoC communications, corresponding interaction metadata, and detected emotions for each VoC segment according to the one or more embodiments as described herein. In an embodiment, the information from table 300 may be the output from emotion detection model 116. Table 300 includes five rows 305A-305E that correspond to five different chat sessions. The five different chat sessions may be illustrative VoC communications that are collected by VoC module 118 at step 210. Column 310 of table 300 includes an identifier, e.g., interaction ID, that uniquely identifies each of the five different chat sessions. The unique identifiers of column 310 may be illustrative interaction metadata that is obtained by the VoC module 118 at step 215.

Column 315 of table 300 includes the time span for each of the segments of the five different chat sessions. The segments for each of the five different chat sessions may be illustrative segments determined based on the preprocessing at step 215. For example, the first chat session in row 305A and identified by unique identifier 277895747 includes a single segment that is 5.37 seconds long. The second chat session in row 305B and identified by unique identifier 277903737 includes two segments. The first segment is seconds in length, while the second segment is 6.74 seconds in length. Similarly, column 315 includes segments of particular lengths for the third, fourth, and fifth chat sessions.

Column 320 of table 300 includes the detected emotions for each of the segments identified in column 315 and corresponding to a particular chat session. The detected emotions may be illustrative emotions detected by the emotion detection model 116 that is a pre-trained model. For example, column 320 includes a detected emotion of neutral in row 305A that corresponds to the first chat session. Therefore, the emotion detection model 116 detected that the customer's emotion was neutral for the single segment of the first chat session that spanned 5.37 seconds.

Column 320 includes detected emotions of concerned and concerned in row 305B that correspond to the second chat session. Therefore, the emotion detection model 116 detected that the customer was concerned during the first segment that spans the first 5.01 seconds of the second chat session. The emotion detection model 116 also detected that the customer was concerned during the second segment that spans the last 6.74 seconds of the second chat session. Column 320 similarly includes other detected emotions for the corresponding segments of the other chat sessions.

Column 325 of table 300 includes an array of values that represents the detected emotions in column 320. In this example, let it be assumed that the detected emotion of neutral is assigned a value of 0, the detected emotion of happy is assigned a value of 1, the detected emotion of concerned is assigned a value of 2, and the detected emotion of angry is assigned a value of 3.

Based on the assignments, the VoC module 118 may generate the arrays that are included in column 325 of table 300. Specifically, the single segment of the first chat session identified in row 305A has a detected emotion of neutral. As such, the VoC module 118 generates an array of [0] that is included in the first row of column 325. The two segments of the second chat session identified in row 305B have detected emotions of concerned and concerned. As such, the VoC module 118 generates an array of [2, 2] that is included in the second row of column 325. The seven segments of the third chat session identified in row 305C have detected emotions of neutral, concerned, neutral, neutral, neutral, neutral, neutral, respectively. As such, the VoC module 118 generates an array of [0, 2, 0, 0, 0, 0, 0] that is included in the third row of column 325. Column 325 includes similar arrays, generated by VoC module 118, for the detected emotions for the segments of the fourth and fifth chat sessions.

Referring back to FIG. 2, the procedure continues from step 225 to step 230 and the VoC module 118 collects customer metadata. In an embodiment, the customer metadata may include data that describes attributes or characteristics of a customer. For example, the customer metadata may include, but is not limited to, age, gender, annual income, location, topics of interest. In an embodiment, the customer metadata for a customer may be referred to a user profile.

In an embodiment, the customer metadata may be collected in any of a variety of different ways and as known by those skilled in the art. For example, a customer may utilize client device 110 to provide the customer metadata to enterprise system 126. Specifically, and when a customer registers with the enterprise system 126 to establish a user account, the customer may provide customer metadata. In addition or alternatively, the VoC module 118 may collect (e.g., pull) the customer metadata from one or more external sources. For example, the VoC module 118 may obtain the customer metadata from one or more social media sites that are used by the customer. As such, it is expressly contemplated that the customer metadata may be obtained in any way and from a variety of different sources.

In an embodiment, the customer metadata may be combined with the segment detected emotions. For example, row 305A of table 300 that includes the segment level emotions for the first chat session may be combined with the customer metadata, e.g., age, gender, and income, of the customer that participated in the first chat session.

The procedure continues from step 230 to step 235, and the VoC module 118 generates emotion attributes for each VoC communication utilizing the segment detected emotions. In an embodiment, the emotion attributes may include, but are not limited to, an emotion ratio value, a normalized volatility value, a normalized length value, and an end score value.

FIG. 4 is an illustration of an example table 400 that includes emotion attributes determined for the five VoC communications of FIG. 3 according to the one or more embodiments as described herein. Table 400 includes five rows 405A-405E that correspond to the five different chat sessions of FIG. 3. Column 410 of table 400 includes the unique identifiers for each of the five chat sessions of FIG. 3.

Column 415 of table 400 includes the emotion ratio values for the five different chat sessions. An emotion ratio value may provide an indication regarding the amount of a particular type of emotion expressed by a customer during a VoC communication. For this example, let it be assumed that the particular type of emotion to be identified with the emotion ratio value is the emotion of concerned. As such, the emotion ratio value indicates the level or amount of concern expressed by a customer during a VoC communication. In an embodiment, a emotion ratio value of 0 indicates that the customer expresses no concern during the entire VoC communication, while a emotion ratio value of 1 indicates that the customer expresses concern during the entire VoC communication. Thus, an emotion ratio value increasing from 0 and approaching 1 is indicative of the customer expressing more concern during the VoC communication.

In an embodiment, the emotion ratio value can be calculated by determining a number of segments of a VoC communication that have a detected emotion of concerned relative to the total number of emotions detected for the VoC communication. For example, and referring to FIG. 3, the second chat session includes two segments, each of which has a detected emotion of concerned. As such, the VoC module 118 may calculate the emotion ratio value for the second chat session as a value of 1 (e.g., ((1+1)/2). The emotion ratio of 1 indicates that the customer expressed concern during the entirety of the second chat session. The emotion ratio value of 1 for the second chat session is included in the second row of column 415 of table 400.

As another example, the third chat session has a total of 7 segments as illustrated in FIG. 3, and 1 of the segments has a detected emotion of concerned. As such, the VoC module 118 may calculate the emotion ratio for the third chat session as a value of 0.1429 (1/7). The emotion ratio of 0.1429 indicates that the customer expressed relatively little concern during the entirety of the third chat session. The emotion ratio value of 0.1429 for the third chat session is included in the third row of column 415 of table 400. Column 415 includes similar emotion ratio values, calculated by VoC module 118, for the first, fourth, and fifth chat sessions.

Column 420 of table 400 includes the normalized length values for the five different chat sessions. A normalized length value may indicate the length of the VoC communication. In an embodiment, a longer length value may indicate that the customer's issues/questions are not being adequately addressed during the chat session. For example, and as illustrated in FIG. 3, the second chat session includes two segments that are, respectively, 5.01 seconds in length and 6.74 seconds in length. The VoC module 118 may add the segment lengths together to calculate the normalized length value for the second chat session as 11.75 seconds. The normalized length value of 11.75 seconds for the second chat session is included in the second row of column 420 of table 400. Column 420 includes similar normalized length values, calculated by VoC module 118, for the first, third, fourth, and fifth chat sessions.

Column 425 of table 400 includes the normalized volatility values for the five different chat sessions. A normalized volatility value may indicate the variance/change in the emotions expressed by the customer during a VoC communication. In an embodiment, the normalized volatility value quantifies the frequency of change in the customer's emotions and/or the degree of change in the customer's emotions during the VoC communication. A normalized volatility value of 0 for a VoC communication may be indicative of a single emotion being expressed by the customer during the entirety, e.g., all segments, of the VoC communication. A normalized volatility value of 1 for a VoC communication may be indicative of many emotions being expressed by the customer and/or the emotions changing drastically during the VoC communication. A normalized volatility value that is increasing from 0 and approaching 1 is indicative of more volatility (e.g., variance in terms of frequency and degree) in the customer's emotions during the VoC communication.

To calculate a volatility value, the VoC module 118 may utilize a difference function and a standard deviation function. For example, and referring to FIG. 3, the array of values representing the detected emotions for the segments of the second chat session is [2, 2]. The VoC module 118 may calculate the difference between subsequent values in the array to generate a difference array of [0]. The difference array indicates that the customer's emotion did not change during the two segments of the chat session. The VoC module 118 may determine the standard deviation of the difference array to calculate the volatility value as 0.0. Therefore, and in this example, the normalized volatility value is also 0.0, thus indicating that the customer's emotion during the second chat session is static, e.g., not volatile. The normalized volatility value of 0.0 for the second chat session is included in the second row of column 425 of table 400.

As another example, the array of values representing the detected emotions for the segments of the third chat session is [0, 2, 0, 0, 0, 0, 0]. The VoC module 118 may calculate the difference between subsequent values in the array to generate a difference array of [2, −2, 0, 0, 0, 0]. The difference array indicates that the customer's emotions changed during the beginning of the third chat session and did not change during a middle portion and end portion of the third chat session. The VoC module 118 may determine the standard deviation of the difference array to calculate the volatility value as 1.1547. Thus, the volatility value for the third chat session is 1.1547.

Because the range of possible emotion values is 3, e.g., [0, 1, 2, 3], the VoC module 118 may normalize the volatility value to be in the range of [0, 1] for the clustering as described in further detail below. In an embodiment, the VoC module 118 may normalize the volatility value to be in a range of [0, 1] using a Min-Max normalization technique. Specifically, the VoC module 118 may utilize a Min-Max normalization technique and calculate the normalized volatility value ($N_{vol}$) as:

$$N_{vol} = \frac{(\mathrm{Vol} - \min(x))}{(\max(x) - \min(x))}$$

where Vol is the volatility value, min(x) is the minimum value in the dataset (e.g., range of possible emotion values) that in this example is 0, and max(x) is the maximum value in the dataset that in this example is 3. It is expressly contemplated that max(x) and min(x) may be different values based on any of a variety of different ranges of values that may be utilized according to the one or more embodiments as described herein.

Therefore, and in this example, the normalized volatility value is 0.3849 for the third chat session. The normalized volatility value of 0.3849 indicates that there was some volatility in the customer's emotion during the third chat session. The normalized volatility value of 0.3849 for the third chat session is included in the third row of column 425 of table 400. Column 425 includes similar normalized volatility values, calculated by VoC module 118, for the first, fourth, and fifth chat sessions.

Column 430 of table 400 includes end score values for the five different chat sessions. An end score value may indicate the emotions of the customer at a phase of the VoC communication that is defined as an end portion of the VoC communication. A customer typically initiates a chat session with a chat agent to discuss issues and/or questions that the customer has. At the end of the VoC communication, the customer will have determined whether the issues and/or questions have or have not been adequately addressed by the chat agent. If the customer's issues and/or questions have been adequately addressed during the VoC communication, the customer is likely to have positive emotions (e.g., happy, neutral) at the end of the VoC communication. If the customer's issues and/or questions have not been adequately addressed, the customer is likely to have negative emotions (e.g., concerned, angry) at the end of the VoC communication. As such, the customer's emotions at the end of the VoC communication may be instructive regarding the customer's overall satisfaction with the VoC communication.

For this example, let it be assumed that the end portion of a VoC communication is defined to be the last three segments of the VoC communication. As such, the VoC module 118 may calculate the end score value based on a weighted average of each emotion of the last three segments of the VoC communication. For this example, let it be assumed that the weights are as follows: neutral=0.5, concerned=0.8, angry=1.0, and happy=0.0. To calculate the end score value, the VoC module 118 may sum the 3 weight values that correspond to the detected emotions for the three last segments and then divide the sum value by 3. An end score value of 0 indicates that the customer is happy at the end of the VoC communication, while an end score value of 1 indicates that the customer is angry at the end of the VoC communication. Additionally, an end score value of 0.5 indicates that the customer emotion is neutral at the end of the VoC communication. As such, an end score value increasing from 0 and approaching 1 is indicative of a customer being less happy and angrier during the end portion of the VoC communication.

For example, and referring to FIG. 3, the detected emotions of the last three segments of the fourth chat session are neutral, happy, and happy, e.g., [0, 1, 1]. Therefore, the weights corresponding to the detected emotions are 0.5, 0.0, 0.0. As such, the VoC module 118 calculates the end score value for the fourth chat session as 0.1667 (e.g., (0.5+0.0+0.0)/3). A value of 0.1667 indicates that the customer is relatively happy at the end of the fourth chat session. The value of 0.1667 is included in the fourth row of column 430 of table 400. Column 430 includes similar end score values, calculated by VoC module 118, for the first, second, third, and fifth chat sessions.

Referring back to FIG. 2, the procedure continues from step 235 to step 240, and the emotion attributes are stored with the segment detected emotions and the customer metadata in VoC database 123. For example, let it be assumed that Jane Doe is the customer that participated in the first chat session that is referenced in rows 305A and 405A of FIGS. 3 and 4, respectively. Further, let it be assumed that Jane Doe's customer metadata indicates that she is a 30-year-old woman that has an annual income of $100,000. Therefore, the VoC database 123 may store an entry, e.g., row, that includes—(1) segment detected emotions for the first chat session as indicated in columns 320 and/or 325 of FIG. 3, (2) the emotion attributes (e.g., emotion ratio value, normalized length value, normalized volatility value, and end score value) for the first chat session as indicated in columns 410-430 of FIG. 4, and (3) the customer metadata indicating that the customer who participated in the first chat session is a female that is 30 years old and has an annual income of $100,000.

The procedure continues to step 245, and the VoC module 118 trains a device using the emotion attributes and customer metadata. Specifically, and as will be described in further detail below, the device may be a clustering model and the training may include (1) generating a plurality of clusters utilizing the obtained customer metadata, and (2) generating an emotion profile for each cluster utilizing the emotion attributes determined for the VoC data corresponding to the customers assigned to the cluster.

For the example described herein, let it be assumed that the customer metadata that is used to generate the plurality of clusters is age, gender, and annual income. Additionally, let it be assumed that the age and income value for each customer is normalized to be in a range of [0, 1] for clustering purposes.

The VoC module 118 may utilize clustering algorithm 119 to generate the plurality of clusters. In an embodiment, the clustering algorithm 119 may be k-means clustering to generate the plurality of clusters, e.g., k clusters, utilizing the three features of age, gender, and annual income. In this example, let it be assumed that k is equal to 8. As such, the VoC module 118 implements the k-means clustering technique to assign each customer to one of the 8 clusters based on the values of the three features (e.g., age, gender, and annual income). Specifically, the VoC module 118 may assign each customer to one of the 8 clusters based on a comparison of the values of the three features and the centroid locations of the plurality of clusters.

In an alternative embodiment, and when more than three features of the customer are utilized, the clustering algorithm 119 may be a density-based spatial clustering of application with noise (DBSCAN) algorithm. Additionally, it is expressly contemplated that any of a variety of different clustering algorithms may be utilized with customer metadata to generate customer clusters according to the one or more embodiments as described herein. In an embodiment, the plurality of customers, e.g., subset of customers, that are assigned to a cluster have related customer metadata.

FIG. 5 is an illustration of an example table 500 defining a plurality of clusters generated utilizing customer metadata according to the one or more embodiments as described herein. Table 500 includes eight rows 505A-505H that correspond to eight different generated clusters. Each customer, for which the VoC data was collected at step 210, is assigned to one of the eight clusters in FIG. 5 based on the customer's age, gender, and annual income.

Column 510 includes a unique identifier, e.g., 0 through 7, for each of the eight clusters. Column 515 includes the normalized age for the customers assigned to each of the eight clusters, and column 520 includes the normalized income for the customers assigned to each of the eight clusters. The age and income for each cluster may be normalized to be in the range of [0, 1]. Additionally, column 525 includes the gender of the customers assigned to each cluster, where 0.0 indicates female and 1.0 indicates male. In an alternative embodiment, a categorical variable may be utilized to indicate male, e.g., M, or female, e.g., F.

To train the cluster model that includes the plurality of clusters, the VoC module 118 may generate an emotion profile for each of the eight clusters. An emotion profile for a cluster may be generated utilizing the emotion attributes (e.g., emotion ratio value, normalized length value, normalized volatility value, and end score value) for the VoC data of the customers assigned to the cluster. For example, let it be assumed that 200 customers are assigned to cluster 0 and there are 300 collected VoC communications for the 200 customers. The VoC module 118 may calculate a mean value from the 300 emotion ratio values corresponding to the 200 customers assigned to cluster 0. The VoC module 118 may similarly calculate a mean value from the 300 normalized length values, the 300 normalized volatility values, and the 300 end score values.

The VoC module 118 may also calculate a standard deviation value from the 300 emotion ratio values corresponding to the 200 customers assigned to cluster 0. The VoC module 118 may similarly calculate a standard deviation value from the 300 normalized length values, the 300 normalized volatility values, and the 300 end scores values.

FIGS. 6A and 6B are an illustration of an example table 600 that includes an emotion profile that may be generated for each of the eight clusters of FIG. 5 according to the one or more embodiments as described herein. Table 600 includes 8 rows 605A-605H that correspond to a different emotion profile that is generated for each of the eight clusters. Specifically, row 605A corresponds to a first emotion profile generated for cluster 0, row 605B corresponds to a second emotion profile generated for cluster 1, and so forth. Column 610 includes a unique identifier, e.g., 0 through 7, for each of the eight clusters. Column 615 includes a mean emotion ratio value for each of the eight clusters. For example, and continues with the example above, the VoC module 118 may add the 300 emotion ratio values corresponding to the 200 customers that are assigned to cluster 0 and then divide that value by 300 to obtain a mean emotion ratio value of 0.1005 for cluster 0. The mean emotion ratio value of 0.1005 is included in the first row of column 615. The mean emotion ratio values for the other clusters are similarly included in the other rows of column 615. The VoC module 118 may similarly calculate the mean length VoC value, the mean volatility value, and the mean end score value that are included in columns 620, 625, and 630, respectively.

Column 635 includes a standard deviation, i.e., SD, emotion ratio value for each of the eight clusters that are calculated by the VoC module. Similarly, columns 640, 645, and 650 respectively include the SD length value, the SD volatility value, and the SD end score value. Thus, each emotion profile (e.g., rows 605A-605H) for each cluster includes a mean and standard deviation value for each of the emotion attributes that correspond to the customers assigned to the cluster.

As such, an emotion profile can be generated for each of a plurality of clusters that is assigned a group of customers that share same or similar characteristics (e.g., age, gender, income). In an embodiment, the emotion profile generated for a cluster may represent the normal or expected emotions experienced during VoC communications by customers who share customer characteristics (e.g., age, gender, income).

Referring back to FIG. 2, the procedure continues from step 245 to step 250, and the clusters are stored with their corresponding emotion profiles in cluster database 124. In an embodiment, an entry, e.g., row, in the cluster database 124 may store cluster attributes (e.g., cluster identifier, normalized age, gender, and normalized income) of a cluster with the emotion profile generated for the cluster. For example, a single row in the cluster database 124 for cluster 0 may store the cluster attributes from row 505A of FIG. 5 and the emotion profile of row 605A of FIGS. 6A and 6B. Similarly, a single row in the cluster database for cluster 1 may store the cluster attributes from row 505B of FIG. 5 and the emotion profile of row 605B of FIGS. 6A and 6B. Six other rows of the cluster database 124 would similarly store the cluster attributes and emotion profiles for clusters 2 through 7. The procedure then ends at step 255.

As will be described in further detail below with reference to FIGS. 7 and 8, new VoC data of a customer may be classified by comparing the emotion attributes for the new VoC data with the emotion profiles of the plurality of clusters. Based on the comparison, one or more clusters may be identified. One or more deviations between the emotion attributes of the new VoC data and the emotion profiles of the identified clusters may be determined. Based on the one or more determined deviations, one or more actions may be determined and/or implemented.

Figure 7:
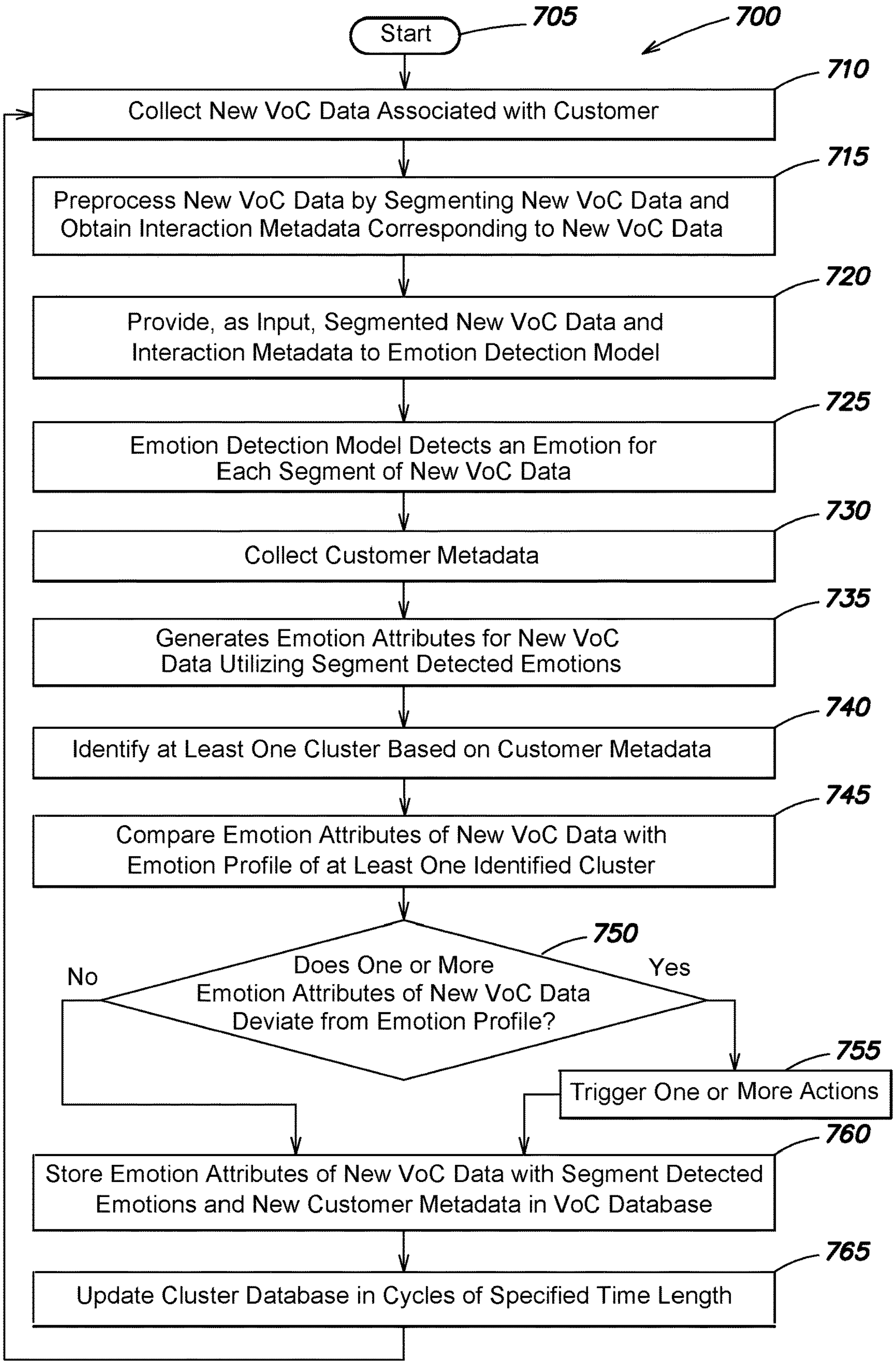
FIG. 7 is a flow diagram of a sequence of steps for classifying VoC data, e.g., new VoC data, utilizing an emotion profile of FIGS. 6A and 6B according to the one or more embodiments as described herein.

FIG. 7 is a flow diagram of a sequence of steps for classifying VoC data, e.g., new VoC data, utilizing an emotion profile of FIGS. 6A and 6B according to the one or more embodiments as described herein. In an embodiment, classifying the VoC data includes determining if the emotion attributes of the VoC data sufficiently correlate or deviate from the emotion profile of at least one identified cluster. If the emotion attributes sufficiently correlate to the emotion profile, it may be determined that the customer's emotions are consistent with (e.g., normal) the expected emotions for a customer having particular customer attributes (e.g., age, gender, income). If the emotion attributes deviate from the emotion profile, it may be determined that the customer's emotions are inconsistent with, i.e., deviate from, the expected emotions. Although FIG. 7 may describe classifying a single new VoC communication, it is expressly contemplated that the procedure of FIG. 7 may be performed for a plurality of different VoC communications in parallel or serially.

In an embodiment, procedure 700 of FIG. 7 may be performed on-demand. For example, authorized personnel of the enterprise may utilize client device 110 to provide an input command such that the procedure 700 of FIG. 7 may be initiated and performed. Alternatively, procedure 700 of FIG. 7 may be performed at one or more predetermined times or on a predetermined schedule. For example, procedure 700 may be performed daily.

The procedure 700 starts at step 705 and continues to step 710 where VoC module 118 collects new VoC data. In an embodiment, new VoC data is (1) a VoC communication that is to be classified utilizing the generated emotion profiles, and (2) has not been already utilized in the generation of an emotion profile for a cluster. For this example, let it be assumed that the new VoC data is a chat session, i.e., VoC communication, between a customer John Doe and a chat agent of the enterprise.

The procedure continues to step 715, and the VoC module 118 preprocesses the new VoC data by segmenting each VoC communication and obtaining interaction metadata corresponding to each VoC communication. The VoC module 118 may preprocess the VoC data and obtain the interaction metadata in a similar manner as described above with reference to step 215 of FIG. 2. The procedure continues to step 720, and the VoC module 118 provides, as input, each segment of the new VoC communication to emotion detection model 116. The VoC module 118 may provide each segment of the new VoC data and the interaction metadata to the emotion detection model 116 as input in a similar manner as described above with reference to step 220 of FIG. 2. The procedure continues to step 725, and the emotion detection model 116 detects an emotion for each segment of the new VoC data. The emotion detection model 116 may detect an emotion for each segment of the new VoC data in a similar manner as described above with reference to step 225 of FIG. 2.

The procedure continues to step 730, and the VoC module 118 collects customer metadata for the customer associated with the new VoC communication. The VoC module 118 may collect the customer metadata in a similar manner as described above with reference to step 230 of FIG. 2. For this example, let it be assumed that the customer metadata for John Doe indicates that he is a 32-year-old male, e.g., a value of 1.0. If John Doe is 32 years old, his normalized age on a mix-max range of 20-85 years is 0.2154. Further, in this example, let it be assumed that John Doe has an annual income that is normalized in the range of [0, 1] to be 0.4500.

The procedure continues to step 735, and the VoC module 118 generates emotion attributes for the new VoC communication utilizing the segment detected emotions. The VoC module 118 may generate the emotion attributes for the new VoC communication in a similar manner as described above with reference to step 235 of FIG. 2. FIG. 8 is an illustration of an example table entry 800 that includes the emotion attributes generated for the new VoC communication of FIG. 7 according to the one or more embodiments as described herein. Column 810 includes an interaction ID for the chat session that John Doe participated in with the chat agent. Column 815 includes an emotion ratio value that indicates the level or amount of concern expressed by John Doe during the chat session. Column 820 includes a normalized length value that indicates the length of John Doe's chat session. Column 825 includes a normalized volatility value that indicates the variance/change in the emotions expressed by John Doe during the chat session. Column 830 includes an end score value that indicates John's emotions at the end of the chat session.

The procedure continues to step 740, and the VoC module 118 identifies at least one cluster based on the customer metadata. In this example, the customer metadata indicates that John Doe is a male, e.g., value of 1.0, and has a normalized age of 0.2154 and a normalized income of 0.4500. The VoC module 118 may compare the customer metadata of John Doe with the customer metadata that defines each of the clusters to identify at least one cluster. For this example, the VoC module 118 compares the customer metadata of John Doe with the customer metadata of the eight clusters as illustrated in columns 515, 520, and 525 of FIG. 5. Based on the comparison, the VoC module 118 may determine that John Doe's customer metadata most closely matches the customer metadata that defines cluster 6.

Specifically, the VoC module 118 may determine that of the 8 clusters, clusters 2, 6, and 7 are defined as male clusters. Additionally, the VoC module 118 may determine that of the 3 male clusters, the normalized age (e.g., 0.2154) and normalized income (e.g., 0.4500) for John Doe is closest to the normalized age (e.g., 0.2136) and normalized income (e.g., 0.3941) of cluster 6. Therefore, the VoC module 118 determines that of the eight clusters, John Doe most closely correlates to the customers of cluster 6. In this example, only a single cluster is identified. However, it is expressly contemplated that more than one cluster may be identified according to the one or more embodiments as described herein.

The procedure continues to step 745, and the VoC module 118 compares the emotion attributes of the new VoC data with the emotion profile of the at least one identified cluster. In this example, the identified cluster is cluster 6. As such, the VoC module 118 compares the emotion attributes as illustrated in FIG. 8 with the emotion profile of cluster 6 as illustrated in row 605G of FIGS. 6A and 6B. For example, the VoC module 118 may compare the emotion ratio value from column 815 with the mean and/or standard deviation emotion ratio values from columns 615 and 635 for cluster 6. Similarly, the VoC module may compare the normalized length value, the normalized volatility value, and end score value for John Doe with, respectively, the mean and/or standard deviation values for cluster 6.

By comparing the emotion attributes to the emotion profiles, the one or more embodiments as described herein provide an improvement when compared to some conventional VoC analysis systems. Specifically, and with some conventional VoC analysis systems, the detected emotions of a new VoC communication may be compared to detected emotions of each of a plurality of other individual VoC communications until a best "fit" or match is identified. Based on the match, conventional VoC analysis systems may perform a reactive action. Such a brute force comparison technique is expensive in terms of processing resources.

The one or more embodiments as described herein compare the determined emotion attributes with emotion profiles, each of which is an aggregation of the emotions for a plurality of VoC communications of a group of customers that share characteristics. Because each profile represents an aggregation of the emotions for a plurality of VoC communications, the one or more embodiments as describe herein obviate the need to perform the brute force comparison with each VoC communication. Performing comparisons to the emotion profiles instead of performing the brute force technique, implemented by some conventional systems, results in performing fewer comparisons. Therefore, the one or more embodiments as described herein conserve processing resources when compared to the described conventional systems. Accordingly, the one or more embodiments as described herein provide an improvement to the computer, e.g., enterprise platform 126, itself.

The procedure continues to step 750, and the VoC module 118 determines if one or more emotion attributes of the new VoC data deviate from the emotion profile. In an embodiment, the VoC module 118 determines that an emotion attribute of the new VoC data deviates if—the emotion attribute (e.g., emotion ratio value, the normalized length value, the normalized volatility value, or the end score value) is not within a range that is defined by the corresponding mean value (e.g., mean emotion ratio value, mean length value, mean volatility value, or mean end score value)+/−a multiple of the standard deviation value. For this example, let it be assumed that the multiple is 1.

In this example, the emotion ratio value is 0.0714, while the mean emotion ratio value and the SD emotion ratio value are 0.2266 and 0.1518 for cluster 6 as indicated in FIGS. 6A and 6B. Therefore, the mean value+/−the standard deviation value produces a range of 0.0748 to 0.3784. As such, the emotion ratio value of 0.0714 is smaller than the mean value minus one standard deviation value. Accordingly, the VoC module 118 determines that John Doe expressed more concern during his chat session than the average amount (e.g., expected amount) of concern that was expressed by other male customers who are similar in age and earned income during their VoC communications. If, however, the multiple was 2, the emotion ratio value would fall in the range defined by the mean+/−two standard deviation values. In this alternative example, the VoC module 118 determines that the amount of concern expressed by John Doe during his chat session is normal in relation to the amount of concern expressed by other male customers who are similar in age and earned income during their VoC communications.

Additionally, the length value, end score value, and volatility value for John Doe's chat session are all within one standard deviation value of the respective mean values for cluster 6. As such, the VoC module 118 determines that the length of John Doe's chat session is normal (i.e., within an acceptable tolerance) in relation to the length of VoC communications by other male customers who are similar in age and earned income. Further, the VoC module 118 determines that John Doe's emotions during the end of his chat session were normal when compared to the average emotions expressed during the end of VoC communications by other male customers that are similar in age and earned income. Finally, the VoC module 118 determines that the volatility of John Doe's emotions was normal when compared to the volatility of the emotions of other male customers that are similar in age and earned income during their VoC communications.

In the example where the multiple is 1, the VoC module 118 determines that one or emotion attribute, e.g., emotion ratio value, deviates from the emotion profile and the procedure continues. Specifically, the VoC module 118 classifies the new VoC data of John Doe as deviating from the emotion profile for other customers with similar characteristics. In response to determining the deviation, the procedure continues from step 750 to 755. At step 755, the VoC module 118 triggers one or more actions for the determined deviations. In an embodiment, the action may be an electronic notification that is generated and transmitted to personnel of the enterprise indicating the deviation. In addition or alternatively, the notification may indicate that John Doe's chat session should be utilized for chat agent coaching/training. In addition or alternatively, the notification may indicate that the customer, e.g., John Doe, should be contacted by personnel based on the deviation and to improve the customer's satisfaction and/or customer experience of the enterprise.

In an embodiment, the action may be an automatic electronic message, e.g., email, sent to the customer indicating that personnel will be contacting the customer to discuss his recent VoC communication and/or his experience with the enterprise. In an embodiment, the action may be intended to cause the customer's experience to change such that customer's emotion attributes are consistent with the emotion profile of the cluster. As such, the one or more embodiments as described herein provide in an improvement in the existing technological field of electronic VoC analysis and processing.

In an embodiment, a list of predetermined actions may be stored in storage architecture 122. Based on determining at least one deviation, the VoC module 118 may access the list of predetermined actions. The VoC module may select a predetermined action from the list of predetermined action based on the type of deviation and the amount of deviation. For example, if the deviation is related to an emotion ratio value that indicates that the customer is expressing a little more than what is deemed to be normal, a particular action may be selected from the list of predetermined actions. If the deviation is related to an emotion ratio value that indicates that the customer is expressing much more concern than what is deemed to be normal, a different action may be selected from the list of predetermined action. Even more, if the deviation is related to a volatility value that indicates that the customer emotions are much more volatile than what is deemed normal, a completely different action may be selected from the list of predetermined actions. As such, the type of deviation, the amount of deviation, and even the types of combined deviations may be utilized to select a particular action.

The procedure continues from step 755 to step 760. The procedure also continues from step 750 to step 760 when the VoC module 1118 determines that the one or more emotion attributes do not deviation from the emotion profile. At step 760, the emotion attributes of the new VoC data are stored with the segment detected emotions and the customer metadata in VoC database 123 as described above with reference to step 240 of FIG. 2.

The procedure continues to step 765 and the VoC module 118 updates the cluster database 124 in cycles of a specified time length. For example, the cluster database may be updated daily, twice a day, or any other time length that is user defined or preconfigured. Let it assumed that the specified time length for cycles is a day. As such, and at the end of the day, the VoC module 118 may update (i.e., train) the cluster database, in a similar manner as described above with reference to step 245 of FIG. 2, using new customer metadata and new VoC data that was collected throughout the day. From step 765, the procedure may revert to step 710 to process new VoC data for the next cycle.

It should be understood that a wide variety of adaptations and modifications may be made to the techniques. For examples, the steps of the flow diagrams as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Additionally, it should be understood that the term user and customer may be used interchangeably. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method for emotion profile prediction using Voice of Customer (VoC) data, the method comprising:

obtaining a plurality of user profiles for a plurality of different users, wherein each of the plurality of user profiles includes user metadata for a different user;

forming a plurality of clusters by a processor of a computing device, wherein each of the plurality of clusters includes a subset of user profiles for a subset of users, wherein formatting the plurality of clusters is based on a determination that the subset of user profiles includes related user metadata;

generating, by the processor, an emotion profile for each of the plurality of clusters, wherein each emotion profile is generated utilizing the VoC data f rom the subset of users with a pretrained language model;

receiving, by the processor, new VoC data and new user metadata for a new user; identifying a selected cluster of the plurality of clusters based on a determination that the new user metadata for the new user correlates to selected metadata of a selected subset of user profiles for the selected cluster;

determining, by the processor and in response to identifying the selected cluster, at least one deviation between emotion attributes of the new VoC data and a selected emotion profile of the selected cluster; and determining an action within a set of predetermined actions, wherein the action is determined based on the at least one deviation.

2. The method of claim 1, wherein the user metadata includes user attributes, and wherein the user attributes for a particular user profile for a particular user includes one or more of (1) an age of the particular user, (2) a gender of the particular user, (3) a location of the particular user, and (4) one or more different subject topics of interest to the particular user.

3. The method of claim 2, wherein when forming the plurality of clusters, the method further comprising:

forming the plurality of clusters using a clustering algorithm, where each of the plurality of clusters includes the subset of user profiles with one or more selected user attributes that are either a same or a substantially same value.

4. The method of claim 1, wherein the VoC data, for each user of the subset of users, includes one or more of (1) one or more transcripts within a predefined time range, (2) one or more audio recordings within the predefined time range, (3) one or more chat sessions within the predefined time range, and (4) one or more emails within the predefined time range.

5. The method of claim 1, wherein when generating the selected emotion profile for the selected cluster, the method further comprising:

collecting interaction metadata for the VoC data for a selected subset of users, wherein the selected subset of users is associated with the selected subset of user profiles included in the selected cluster;

segmenting the VoC data, for the selected subset of users, into one or more different lengths, wherein the segmenting generates a plurality of segments;

providing the plurality of segments and interaction metadata as input to the pretrained language model;

determining, by the pretrained language model, a segment-level emotion value for each segment of the plurality of segments to generate emotion detection results; and extracting a plurality of key attributes based on an analysis of the emotion detection results.

6. The method of claim 5, wherein each of the plurality of key attributes quantify one or more expected emotions for the new user.

7. The method of claim 6, wherein when generating the selected emotion profile, the method further comprising:

calculating the selected emotion profile based on (1) determining an average value for each of the plurality of key attributes and (2) determining a standard deviation for each of plurality of key attributes.

8. The method of claim 7, wherein the at least deviation is an indication that an emotion attribute value for a particular emotion attribute is outside a range defined by the average value for a corresponding key attribute plus or minus the standard deviation value for the corresponding key attribute.

9. The method of claim 1, further comprising:

updating the selected emotion profile using the emotion attributes of the new VoC data.

10. The method of claim 1, wherein the action includes a notification indicating that the new user is dissatisfied and that the new user should be contacted.

11. A system for emotion profile prediction using Voice of Customer (VoC) data, the system comprising:

a processor coupled to a memory, the processor configured to:

obtain a plurality of user profiles for a plurality of different users, wherein each of the plurality of user profiles includes user metadata for a different user;

generate a plurality of clusters, wherein each of the plurality of clusters includes a subset of user profiles for a subset of users, wherein generating the plurality of clusters is based on a determination that the subset of user profiles includes related user metadata;

generate an emotion profile for each of the plurality of clusters, wherein each emotion profile is generated utilizing the VoC data from the subset of users with a pretrained language model;

receive new VoC data and new user metadata for a new user;

identify a selected cluster of the plurality of clusters based on a determination that the new user metadata for the new user correlates to selected metadata of a selected subset of user profiles f or the selected cluster;

determine, in response to identifying the selected cluster, at least one deviation between emotion attributes of the new VoC data and a selected emotion profile of the selected cluster; and determining an action within a set of predetermined actions, wherein the action is determined based on the at least one deviation.

12. The system of claim 11, wherein the user metadata includes user attributes, and wherein the user attributes for a particular user profile for a particular user includes one or more of (1) an age of the particular user, (2) a gender of the particular user, (3) a location of the particular user, and (4) one or more different subject topics of interest to the particular user.

13. The system of claim 11, wherein when generating the plurality of clusters, the processor further configured to:

generating the plurality of clusters using a clustering algorithm, where each of the plurality of clusters includes the subset of user profiles with one or more selected user attributes that are either a same or a substantially same value.

14. The system of claim 11, wherein the VoC data, for each user of the subset of users, includes one or more of (1) one or more transcripts within a predefined time range, (2) one or more audio recordings within the predefined time range, (3) one or more chats within the predefined time range, and (4) one or more emails within the predefined time range.

15. The system of claim 11, wherein when generating the selected emotion profile for the selected cluster, the processor further configured to:

collect interaction metadata for the VoC data for a selected subset of users, wherein the selected subset of users is associated with the selected subset of user profiles included in the selected cluster;

segment the VoC data, for the selected subset of users, into one or more different lengths, wherein the segmenting generates a plurality of segments;

provide the plurality of segments and interaction metadata as input to the pretrained language model;

determine, using the pretrained language model, a segment-level emotion value for each segment of the plurality of segments to generate emotion detection results; and extract a plurality of key attributes based on an analysis of the detection prediction results.

16. The system of claim 15, wherein each of the plurality of key attributes quantify one or more expected emotions for the new user.

17. The system of claim 16, wherein when generating the selected emotion profile, the processor further configured to:

calculate the selected emotion profile based on (1) determining an average value for each of the plurality of key attributes and (2) determining a standard deviation for each of plurality of key attributes.

18. The system of claim 11, wherein the processor is further configured to:

update the selected emotion profile using the emotion attributes of the new VoC data.

19. A non-transitory computer readable medium having software encoded thereon, the software when executed by one or more computing devices operable to:

obtain a plurality of user profiles for a plurality of different users, wherein each of the plurality of user profiles includes user metadata for a different user;

generate a plurality of clusters, wherein each of the plurality of clusters includes a subset of user profiles for a subset of users, wherein the subset of user profiles includes related user metadata;

generate an emotion profile for each of the plurality of clusters, wherein each emotion profile is generated utilizing voice of customer (VoC) data from the subset of users with a pretrained language model;

receive new VoC data and new user metadata for a new user;

identify a selected cluster, of the plurality of clusters, based on a determination that the new user metadata for the new user correlates to selected metadata of a selected subset of user profiles for the selected cluster;

determine, in response to identifying the selected cluster, at least one deviation between attributes of the new VOC data for the new user and a selected emotion profile of the selected cluster; and determine an action within a set of predetermined actions, wherein the action is determined based on the at least one deviation.

20. The non-transitory computer readable medium of claim 19, wherein the user metadata includes user attributes, and wherein the user attributes for a particular user profile for a particular user includes one or more of (1) an age of the particular user, (2) a gender of the particular user, (3) a location of the particular user, and (4) one or more different subject topics of interest to the particular user.

* * * * *

UNITED STATES PATENT AND TRADEMARK OFFICE

CERTIFICATE OF CORRECTION

PATENT NO. : 11,922,444 B1
APPLICATION NO. : 18/103775
DATED : March 5, 2024
INVENTOR(S) : Sihan Zha et al.

It is certified that error appears in the above-identified patent and that said Letters Patent is hereby corrected as shown below:

In the Claims

Column 20, Line 22 should be corrected to read:
"the emotion detection results"

Signed and Sealed this
Fourth Day of June, 2024

Katherine Kelly Vidal

Katherine Kelly Vidal
*Director of the United States Patent and Trademark Office*